United States Patent
Bakshan et al.

(10) Patent No.: US 10,042,717 B2
(45) Date of Patent: Aug. 7, 2018

(54) DISTRIBUTED LOCAL BACKUP AND RESTORE SYSTEM USING PEER-TO-PEER BACKUPS

(71) Applicant: VMware, Inc., Palo Alto, CA (US)

(72) Inventors: Igal Bakshan, Herzliya (IL); Rami Stern, Herzliya (IL); Chen Doar, Herzliya (IL); Meytal Genah, Herzliya (IL); Dmitry Rabinovich, Herzliya (IL)

(73) Assignee: VMware, Inc., Palo Alto, CA (US)

(*) Notice: Subject to any disclaimer, the term of this patent is extended or adjusted under 35 U.S.C. 154(b) by 248 days.

(21) Appl. No.: 15/173,696

(22) Filed: Jun. 5, 2016

(65) Prior Publication Data
US 2017/0351581 A1 Dec. 7, 2017

(51) Int. Cl.
*G06F 17/00* (2006.01)
*G06F 11/14* (2006.01)
*G06F 17/30* (2006.01)

(52) U.S. Cl.
CPC ...... *G06F 11/1464* (2013.01); *G06F 11/1453* (2013.01); *G06F 17/30156* (2013.01); *G06F 17/30174* (2013.01); *G06F 2201/84* (2013.01)

(58) Field of Classification Search
CPC ............. G06F 2201/84; G06F 11/1464; G06F 11/1453; G06F 17/30156; G06F 17/30174
USPC ........................................................ 707/622
See application file for complete search history.

(56) References Cited

U.S. PATENT DOCUMENTS 5,644,766 A * 7/1997 Coy .................. G06F 17/30067
7,962,452 B2 * 6/2011 Anglin .............. G06F 17/30156
707/634
8,799,413 B2 * 8/2014 Taylor ............... G06F 17/30215
709/219
9,020,900 B2 * 4/2015 Vijayan
Retnamma ........ G06F 17/30312
707/652
9,448,893 B1 * 9/2016 Whitehead ........ G06F 17/30144
(Continued)

FOREIGN PATENT DOCUMENTS

WO   WO 2011/002777 A2 *   1/2011   ............. G06F 15/16

OTHER PUBLICATIONS

Lillibridge, Mark, et al., "Sparse Indexing: Large Scale, Inline Deduplication Using Sampling and Locality", FAST '09, The 7th USENIX Conf. on File and Storage Technologies, San Francisco, CA, Feb. 24-27, 2009, pp. 111-123.*

(Continued)

*Primary Examiner* — Robert Stevens (57) ABSTRACT

Local distributed backup techniques are described, where each client device calculates a manifest of its files and sends the manifest to a central server. The server performs deduplication based on the received manifest to determine which files are missing and need to be backed up, and notifies the client of those files. At this point, instead of uploading the missing files to the central server, the files are instead uploaded to another peer client device that has sufficient disk space and resides in the network vicinity of the original client device. The upload may be done to multiple peers for redundancy. Upon backup completion, the client state may be left as-is, in which case the client periodically uploads incremental updates to keep any changes synchronized with the backup peer. Alternatively, the client can be centralized to the central server, but at a later time when more resources are available.

20 Claims, 6 Drawing Sheets

(56) References Cited

U.S. PATENT DOCUMENTS

| | | | | |
|---|---|---|---|---|
| 9,483,201 | B2* | 11/2016 | Kripalani | G06F 3/065 |
| 9,678,968 | B1* | 6/2017 | Taylor | G06F 17/30117 |
| 2010/0274765 | A1* | 10/2010 | Murphy | G06F 11/1451 707/652 |
| 2013/0238572 | A1* | 9/2013 | Prahlad | G06F 17/30082 707/692 |
| 2014/0181016 | A1* | 6/2014 | Whitehead | G06F 11/00 707/613 |
| 2014/0181041 | A1* | 6/2014 | Whitehead | G06F 11/1448 707/652 |
| 2016/0170657 | A1* | 6/2016 | Suehr | G06F 3/06 711/162 |

OTHER PUBLICATIONS

Min Jaehong, et al., "Efficient Deduplication Techniques for Modern Backup Operation", IEEE Transaction on Computers, vol. 60, No. 2, Jun. 2011, pp. 824-840.*

Zhou, Bing, et al., "Efficient File Communication via Deduplication over Networks with Manifest Feedback", IEEE Communications Letters, vol. 18, No. 1, Jan. 2014, pp. 94-97.*

Issy Ben-Shaul, "Wanova Mirage Cloud Desktop Management Architecture" WANOVA, Jun. 2011, 15 Pages.

* cited by examiner

DISTRIBUTED LOCAL BACKUP AND RESTORE SYSTEM USING PEER-TO-PEER BACKUPS

TECHNICAL FIELD

The present disclosure generally relates to backup and restore techniques in networked computing environments and more particularly relates to backing up data between peer client devices as coordinated by a central server.

BACKGROUND

There exist a number of centralized backup and recovery solutions that are often utilized by IT departments of large organizations. These centralized backup solutions typically include functions for copying and archiving computer data so that it may be used to restore the original data after a loss event. For example, some backup software running on each end user's computer may periodically backup that user's data (e.g., documents, images, emails, etc.) to a central storage location, which may itself be replicated. If a user's computer subsequently breaks or malfunctions, the user's data could then be retrieved from the central storage location and provided to the user on a new or repaired device.

While these backup and recovery solutions have helped IT departments protect employee data from loss, a number of inefficiencies remain in this space. In a typical scenario, when initially deploying a backup and recovery solution in a large organization, all of the client devices on the network need to upload their data to the central location for the first time in a process sometimes referred to as centralization. During this time period, because many client devices are uploading large amounts of data on a mass scale, server resources and network bandwidth are usually vastly utilized, preventing the IT manger from performing other management tasks such as application distribution. In some cases, the server does not have sufficient input/output operations (IOPs) to serve all of the upload requests and the network connections between the server and the client devices are highly congested. Another challenge with centralization is the costly storage requirements in the data-center, as well as either very expensive or slow network links. A more efficient method of performing a backup of client devices for recovery purposes is desirable.

DETAILED DESCRIPTION

Systems and methods in accordance with various embodiments of the present disclosure provide an alternative and more efficient method to backup client devices for recovery purposes, referred to herein as local distributed backup (LDP). With LDP, each client device first calculates a manifest of its stored files and sends the manifest to a central server. The server performs a deduplication analysis based on the received manifest to determine which files are missing and need to be backed up, and notifies the client of those files. At this point, instead of uploading the missing files to the central server (as in the case of traditional backup), the files are instead uploaded to another peer client device that has sufficient disk space and resides in the network vicinity of the original client device. In some embodiments, the upload may be done to multiple peers for redundancy, since clients might be offline, powered off or simply fail.

Upon successful completion of the backup, the IT manager (or other administrative user) can decide to leave the client state as is, in which case the client will be periodically uploading incremental updates to the delegated peer in order to keep any changes made on the client device synchronized with the backup peer. Alternatively, the IT manager can choose to centralize the endpoint to the central server in the data center if so desired, but at a later time when more resources are available. In this manner, the load on the server is substantially reduced during the initial backup period, when all client devices are uploading their individual unique data. In addition, if the client device data has been backed up on the server, the IT manager has an option to reverse the process by creating a backup peer for the client and deleting the client's unique data from the server in the data center. For instance, when data-center storage needs to be freed up or network traffic needs to be reduced, LDP allows backup data to be distributed among peer client devices either temporarily or permanently. To allow flexibility, client device backup can be centralized/distributed or both.

The LDP approach can improve the utilization of IT resources by employing the usually under-utilized client storage capacity, decreasing the points of failure in the backup system by having a distributed file system across many endpoints, lowering the overall storage workload and reducing the time and overhead of the initial backup (centralization) of all client devices on the network.

In order to begin the initial process of backing up all client devices, each client device first generates a manifest that contains metadata identifying the listing of all files and directories on the device. Each file's metadata in the manifest may be comprised of the file size, attributes data hash-value and the like. In one embodiment, the manifest is a representation of the client's file system structure and stores the file system tree structure and a unique identifier (e.g. MD5-Checksum) for each file. The client device sends the manifest to the central server over the network. In some embodiments, the client device also sends the manifest to the backup peer client devices that reside in the same logical backup cluster as the client device. Once the server receives the manifest, the server processes the manifest in order to construct a similar structured manifest file, containing only the metadata for the subset of files which are not readily available either on the central server (e.g., those files which the server has not already received from other devices) or on peer client devices in the client's logical backup cluster.

In order to reduce the storage capacity and I/O requirements, a number of optimizations can be performed. To begin with, all backed up files are stored in a single instance store (SIS) such that only a single copy of each unique file will be stored in the SIS. The server contains a central SIS and each client device that serves as a backup peer for other clients contains its own individual SIS. When the server receives a manifest from an endpoint client device, the server first determines whether the file is already available in the single instance store on the server or in the single instance stores of backup peers in the client's cluster. If the file is not available in any of these locations, the server selects an appropriate peer backup device(s) from the same cluster as the client which has sufficient storage capacity and sends an instruction to the client, instructing the client to upload the file to the selected backup peer client device(s). The client then sends the file to the designated backup peer device(s), where the file is backed up for restore purposes. The server may also schedule the file to be uploaded to the server at a later time in order to obtain a fully centralized backup of all data but during a time when system resources are not overloaded.

Figure 1:
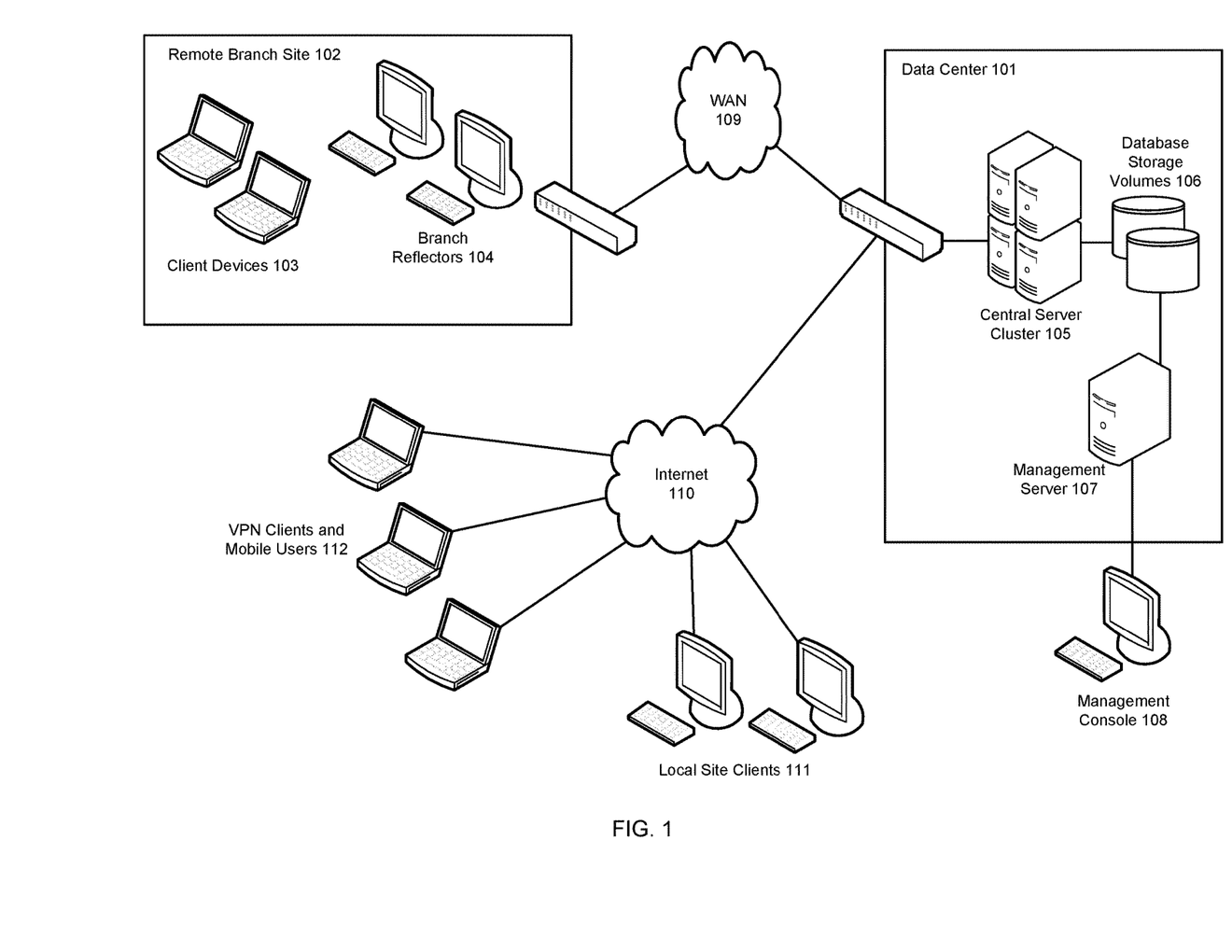
FIG. 1 illustrates an example of a distributed backup and restore system that may implement peer-to-peer backups, in accordance with various embodiments.

FIG. 1 illustrates an example of a distributed backup and restore system that may implement local distributed backup (LDP), in accordance with various embodiments. As illustrated in this example, the system can be used to provide centralized image management with disaster recovery capabilities. For each client device, the central server is capable of storing the entire image either in storage in the data center 101 or on peer client devices and the system can also maintain a number of historical point-in-time snapshots of each client based on configured intervals. The deployment of the backup system in the data center 101 may comprised of a management server 107, including a management console 108 that can be accessed by an administrator, a central server cluster 105, and the database and storage volumes 106 that can be used to store a repository of desktop snapshots and image repository, as well as any metadata used for management purposes.

In various embodiments, an agent application and driver are installed on every endpoint device (i.e., client device), including devices at each remote branch site 102, on local site clients 111, and any VPN or mobile clients 112 that might be connected over the Internet 110. The agent generally operates in the background on a client device while the end user is free to use their device. While transparently operating in the background, the agent can perform a number of functions, including backing up an image of all the data of the device to the central server 105 or to other peer client devices using the methodologies described herein, as well as allowing the central server 105 to distribute any software updates or modifications to the device.

When performing an initial backup, the agent is first installed on a client device and begins the backup process by scanning the contents of the local file system in the client device to generate a full manifest. The manifest is then uploaded to the central server 105. The central server 105 performs a deduplication calculation on the manifest in order to determine which files are not already available either on the server or on other peer devices in the same local cluster as the client device. In some embodiments, the server 105 may need to define a logical cluster for each client device. The logical cluster indicates which client devices need to be backed up to which other client devices so that the data transfer is more localized, accessible and efficient. For example, the server 105 might define one logical backup cluster that includes client devices (103, 104) that reside in remote branch site 102 and a different logical backup cluster that includes local site clients 111. In that scenario, client devices 103 and 104 would be able to backup data between each other and the central server 105, while client devices 111 would be able to backup data between each other and the central server 105. In some embodiments, the logical backup clusters may be automatically assigned by the server 105, while in other embodiments, the clusters may be manually configured or modified by an administrator.

In order to create an optimal logical backup cluster, several variables may be examined that affect cluster behavior. For example, the client physical proximity to each other may be important because this will affect latency, and client devices that are physically closer to each other will probably have higher bandwidth than more distant endpoints. Furthermore, the deduplication ratio between client devices should be taken into account. Where the deduplication ratio is low, there will be more traffic between clients in the cluster. It may also be advantageous if the replication factor of the data in the cluster affects the size of the cluster. The replication factor of a file indicates how many other client devices contain a copy of the same file. Finally, the users themselves should be taken into account when deciding on the cluster's structure. Users on the same team or in the same business unit will probably have the same data as time progresses and will be more likely to be active at the same time. Also sharing files between users in similar positions, roles or ranks in the organization is likely to be more secure than spreading the files across different teams. In various embodiments, in order to create a backup cluster, the system can utilize a clustering algorithm, taking into account some or all of the above-mentioned parameters. On client's connection to the main server, after sending the files and characteristics of the endpoint, the cluster structure can be calculated and assigned. This can be repeated periodically to ensure that the cluster definitions are optimal.

Once the logical backup clusters have been defined, the server can use them to direct and coordinate the initial backup process between all of the client devices. Further details about the backup process will be described in further detail with reference to FIG. 2 below, while the restore process will be described in further detail with reference to FIG. 3 below.

Once the initial backup process is complete, the agent can periodically synchronize with the central server or backup peer client devices (or both) any ongoing changes that the user may make to their device. The backup system described herein can optimize both the initial process of centralization and the on-going synchronization of endpoint images. Both the network and storage resources can be optimized. For example, one of the methods to optimize network bandwidth is by file-level de-duplication. Many copies of the same file, identified by the same unique signature, located across different devices, might not need to be transferred over the network because they may already exist on backup peers. The same optimization applies for familiar intra-file data chunks (e.g., blocks, pages, etc.). Redundant data chunks transfer is eliminated or reduced, by using chunk caching in the single instance store (either on the server or on backup peers). The cache entries may be evicted, when the cache reaches a certain size limit, based on chunk popularity measurement. Also, chunk transfer can be eliminated when a previous snapshot of the same file contains similar data chunks (intra-file chunk-level optimization). In addition, data chucks can be compressed using a compression algorithm before being sent over the network.

As mentioned above, the agent can also enable an administrator to use the management console 108 to distribute any changes or software updates to the device. When an administrator initiates such an update, the server 105 can distribute any changes to the agent and the agent can perform the changes to the device in the background while the user is using their device. In various embodiments, some endpoint devices can be designated to be branch reflectors (BRs) 104, which are used to reduce the wide area network (WAN) 109 bandwidth requirements for content delivery from the server to the clients by sending the update only once from the central server 105 to the BR 104 and then propagating the update locally over local area network (LAN) from the BR 104 to the other client devices 103 in the branch site 102.

It should be noted that, as used throughout this disclosure, the terms "endpoint device" and "client device" are often used interchangeably to mean any computing device having processors and memory and capable of executing various applications, operating systems or the like. In at least some embodiments, the client device can alternatively be a virtual machine that is executed on a host computing device by utilizing a hypervisor, virtual machine manager (VMM) or other virtualization software. In such virtualized embodiments, the agent can be downloaded and installed on a virtual machine or by simply adding the agent to a template for a virtual machine.

Figure 2:
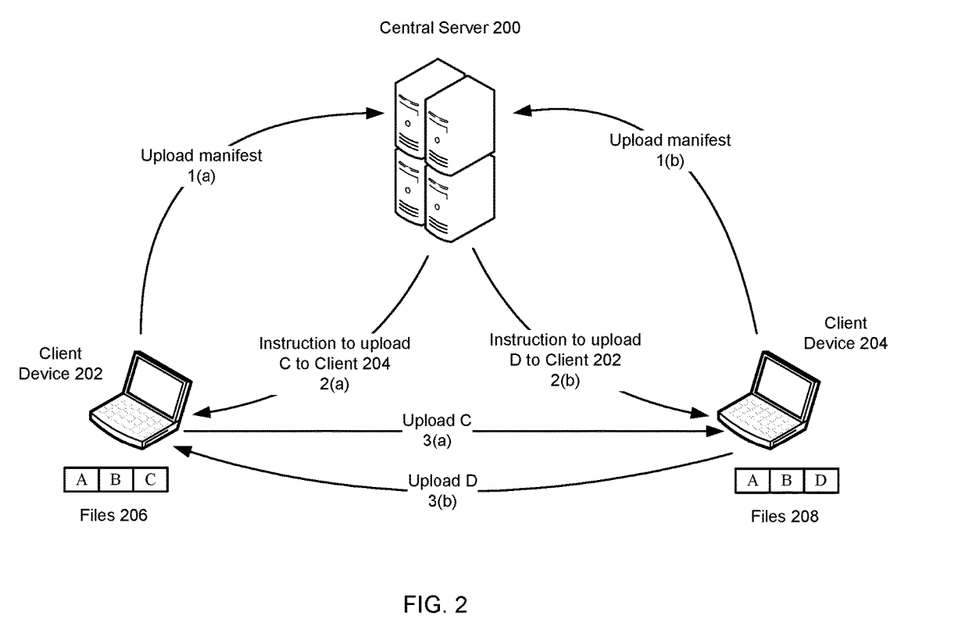
FIG. 2 illustrates an example of a system diagram during backup, in accordance with various embodiments.

FIG. 2 illustrates an example of a system diagram during backup, in accordance with various embodiments. As illustrated in the diagram, during the initial backup, an agent operating on each client device (202, 204) first scans the file system on the device and constructs a file manifest. The file manifest contains the file system structure (including all directories, etc.) and a unique identifier (e.g. MD5-Checksum) for each file. Each client device (202, 204) then uploads its individual manifest to the central server 200, as indicated with arrows 1(*a*) and 1(*b*). Note that it is assumed in this diagram that client device 202 and client device 204 belong to the same logical backup cluster, as defined by the central server 200.

Once the server receives the manifests from each client device (202, 204), the server performs a deduplication calculation. The deduplication calculation for each manifest is comprised of determining which subset of the files in the original manifest is already located either on the central server 200 or on another peer client device that resides in the same cluster. As illustrated in this particular diagram, client device 202 contains files A, B and C (206), while client device 204 contains files A, B and D (208). Therefore, the original file manifest uploaded by client 202 will contain all files A, B and C (206) and the file manifest uploaded by client 204 will contains all files A, B, and D (208). After performing the deduplication calculation on the manifests of client devices 202 and 204, the central server 200 would determine that file C should be backed up from client device 202 to client device 204 and that file D should be backed up from client device 204 to client device 202. For the original manifest received from client 202, the central server may then create a manifest containing file C and send the manifest back to client 202 to indicate to client 202 that file C is not available in backup storage. Furthermore, the server 200 selects a backup peer device in the same logical cluster (in this example, client 204) and sends an instruction to client 202 to upload the file C to the selected client 204, as indicated with arrow 2(*a*). A similar deduplication calculation would be performed on the manifest received from client 204, where the server would determine that file D would need to be backed up to client 202 and send an instruction to client 204 to upload file D to client 202, as indicated with arrow 2(*b*). Once the client device 202 receives the instruction from the server 200, it would upload its file C to client 204 (arrow 3(*a*)) and similarly, client device 204 would upload the file D to client device 202 (arrow 3(*b*)).

At this point, each client device (202, 204) is fully backed up to at least one backup peer device in the logical backup cluster. Note that in most deployments, it will be preferable to backup each file to more than one backup peer device. As such, while this diagram only shows two client devices, similar operations can be performed to backup each client device to multiple peers.

After each client device has been backed up to a sufficient number of peer backup devices, the IT administrator can opt to leave the state of the backup in this state, or alternatively, can cause the server 200 to schedule the client devices (or backup peer devices) to upload the backed up copies of files to the central server after a period of time has passed. If the administrator leaves the state as-is, each client device would periodically synchronize any changes made to its designated backup peer device(s). This could be performed by exchanging manifests either with the server or directly with the backup peer devices. In this case, the manifest would contain only the files that have been modified (added, removed or changed) since the time of the last backup.

If the files are scheduled to be centralized, the client device or its backup peer device can upload the file after a period of time has passed. For example, the server may schedule the centralization to take place after the initial backup phase is complete and all client devices have been backed up to at least a predetermined minimum number of peer devices. Furthermore, it may be efficient to schedule the centralization to take place during less-busy time periods (e.g. not during business hours, after midnight, etc.). The server may also schedule the clients to upload the backup data to the server in small batches (e.g., restricted to one client or a few clients at a time) so as not to overload the network with traffic or impact the IOPs of the server.

In various embodiments, security may be an important consideration when backing up content between peer client devices on the network since storing files on different devices would normally increase security risks. In order to make the backups more secure, a number of measures can be taken. First, the single instance store (SIS) of each client device should be encrypted, such as by using directory encryption or by placing the SIS in an encrypted storage volume on the device. Second, each client device should have its own certificate and the other clients on the cluster should recognize it to prevent the possibility of impersonation. Third, there may be certain files (e.g. highly sensitive files) that should not be distributed to other client devices and these files may need to be excluded from the upload policy. In some embodiments, roles may be added to the cluster and the system can ensure that sensitive files will only be uploaded to clients with the same role or with higher permissions.

Furthermore, the fact that data is stored on other client devices can affect the availability of the data due to, for example, users shutting down or disconnecting their individual devices. This human factor should be taken into account in order to ensure the availability of data. As already mentioned, one way to reduce the likelihood of data becoming unavailable is to save the backup data in storage that is distributed across numerous client devices. In addition, the agent operating on each device may be configured to monitor the device for file usage and detect system events such as system shutdown and other special events. When the agent recognizes that a backed up file has been opened with write permissions, the agent can create a copy of the file in the single instance store to keep the original file available on the cluster. Similarly, when the agent detects a shutdown event in the system, it can alert the central server that tracks the client devices in the cluster. If shutting down the device would hurt the file's availability the agent can postpone the shutdown event until the files are copied to the server or to another member of the cluster. If at any time, a file becomes corrupted, the client can query the cluster (or the server) for a good copy.

In some embodiments, to further improve data availability, data replication may need to be implemented. Data replication can be managed by a global database that acts as a file index. The index may keep track of the number of file occurrences in the local single instance stores in a cluster and whether the file exists in storage. The index can also hold the number of file references in different devices in the cluster to allow file deletion. Keeping track of this information can also enable the ability to restore files between different clusters. An additional benefit to implementing such a global database is the ability to schedule file upload to the server by replication factor. When scheduling based on replication factor, files with the least replication factor will be uploaded to the server first, followed by files with increasingly greater replication factor. As such, files which are unique to each client device will be backed up before files which are commonly found on other client devices in the cluster.

In some embodiments, to further reduce the possibility of missing data, a cluster could be assigned with a storage area network (SAN) for the cluster's usage. The SAN can try to remain as updated as possible with the files in the cluster. At any time a cluster member (e.g. dedicated client device) could mount the SAN and update it. If the client device mounting the SAN becomes disconnected, a different client device can take over its functions.

To improve usability of the backup system described herein, it may be helpful to consider user experience and scalability of the system. One consideration of improving usability is that LDB should not affect the user's work and should not occupy an excessive amount of storage on each client device. Any impact on user work can be reduced by throttling each client's backup processes. To reduce the impact to storage capacity, each client's SIS can be limited by policy (or upon installation) and redirecting files to central storage or to other client devices when the limit has been exceeded. Scalability can be addressed by adding physical storage to the network or additional clients or virtual machines to the cluster.

In various embodiments, data transfer and file identification between client devices in the cluster can be performed according to a specific protocol. Every member of the cluster can have an identifier (ID) and the files are uploaded to the client devices in the ID set of the file. As one example, the ID set of the file can be calculated based on the following formula:

$$ID_{set} = \text{HASH modulo} |\text{Cluster}| + i, \quad 0 < i < \text{replication factor}$$

When a client device request a file, it will assume that the file will be found in its ID set that is computed using the above formula. This can make the files easier to locate among the members in the cluster.

In various embodiments, large files may in some cases become a strain on local distributed backup (LDP) if the replication factor of such files is high. Spreading such large files across the system can consume a lot of storage and thus, it may be desirable to set a lower replication factor for these files. Additionally, large files may be handled by chunking them into multiple blocks and distributing blocks across the cluster instead of distributing the original file.

Figure 3:
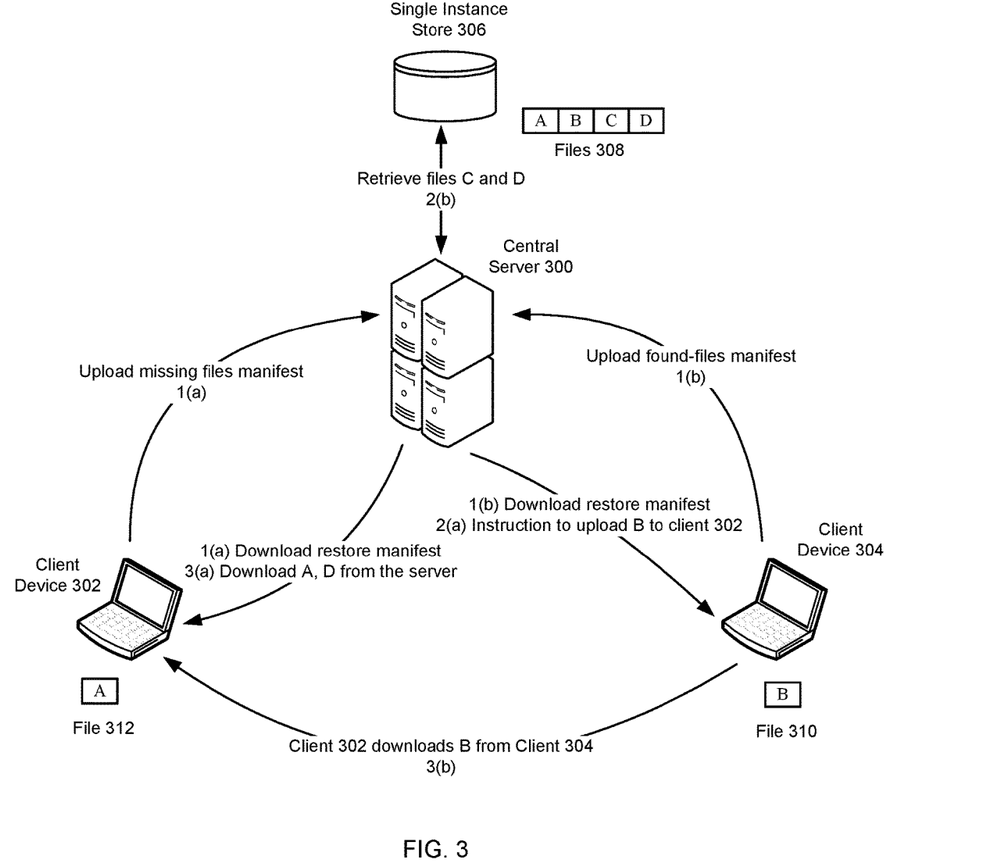
FIG. 3 illustrates an example of a system diagram during a restore process, in accordance with various embodiments.

FIG. 3 illustrates an example of a system diagram during a restore process, in accordance with various embodiments.

Once any client device has been backed up, the central server 300 can maintain a restore manifest that identifies all files that comprise the entire backup image of the client device. Note that the restore manifest contains the identification information for the files (e.g. file system structure, MD-5 Checksum hashes) and not the actual content of those files. The content of the files identified in the manifest may be located on the central server or on backup client devices in the cluster or both.

As illustrated, a restore process may be initiated by the client device 302 downloading a restore manifest from the central server and performing a local deduplication calculation to determine which subset of files of the restore manifest need to be recovered because they are missing from client device 302. The deduplication calculation yields a missing files manifest, which is uploaded by the client device 302 to the central server 300. This initial process is shown by arrows 1(a) in the diagram. Note that in this example diagram, the single instance store 306 managed by the central server 300 contains a backup of all unique files 308 of all client devices (302, 304) on the network, including files A, B, C and D. In addition, client device 302 contains a copy of file A (312) and client device 304 contains a copy of file B (310). In order to restore client device 302 in this example, it is necessary for client device 302 to recover all of the following files A, B, C and D and therefore, the restore manifest that is transmitted to the client device 302 contains identification information, identifying each of these files (A, B, C, D). It should also be noted that since client device 302 already contains a copy of file A (312), this file does not need to be recovered. Therefore, the missing files manifest sent from the client device 302 to the server 300 would indicate only files B, C and D.

Once the server 300 receives the missing files manifest from client device 302, the server can provide the restore manifest to client 304, and client 304 can determine which of the files are available on client 304 and upload the found files manifest to the central server 300 to indicate to the server which files are available on the client 304, as indicated by arrows 1(b). In this case, the client device 304 contains file B (310) and therefore, the found files manifest sent from the client device 304 to the server 300 would indicate file B.

Once the server has received the missing files manifest from client device 302 and the found files manifest from client device 304, the server 300 can send an instruction to client device 304 to send file B (310) to client device 302 (arrow 2(a)), while the remaining files C and D can be downloaded by the central server 300 from the single instance store 306 (arrow 2(b)) and transmitted to client device 302 (arrow 3(a)). In response to the server's instructions, client device 304 can deliver file B (310) to the client device 302, as indicated by arrow 3(b). Since file A is already available on client device 302, it does not need to be recovered.

It should be noted that the process flow illustrated in this example and in other examples throughout this description are not intended to be limiting and could be implemented in different sequences, combined or separated out further as will be evident to one of ordinary skill in the art based on the teachings of this specification. For example, references to downloading versus uploading are in many cases interchangeable since they both achieve the same function of delivering content from one device to another. Similarly, the sequence of instructions can in some cases be changed while still achieving the same end result of restoring a client device.

Figure 4:
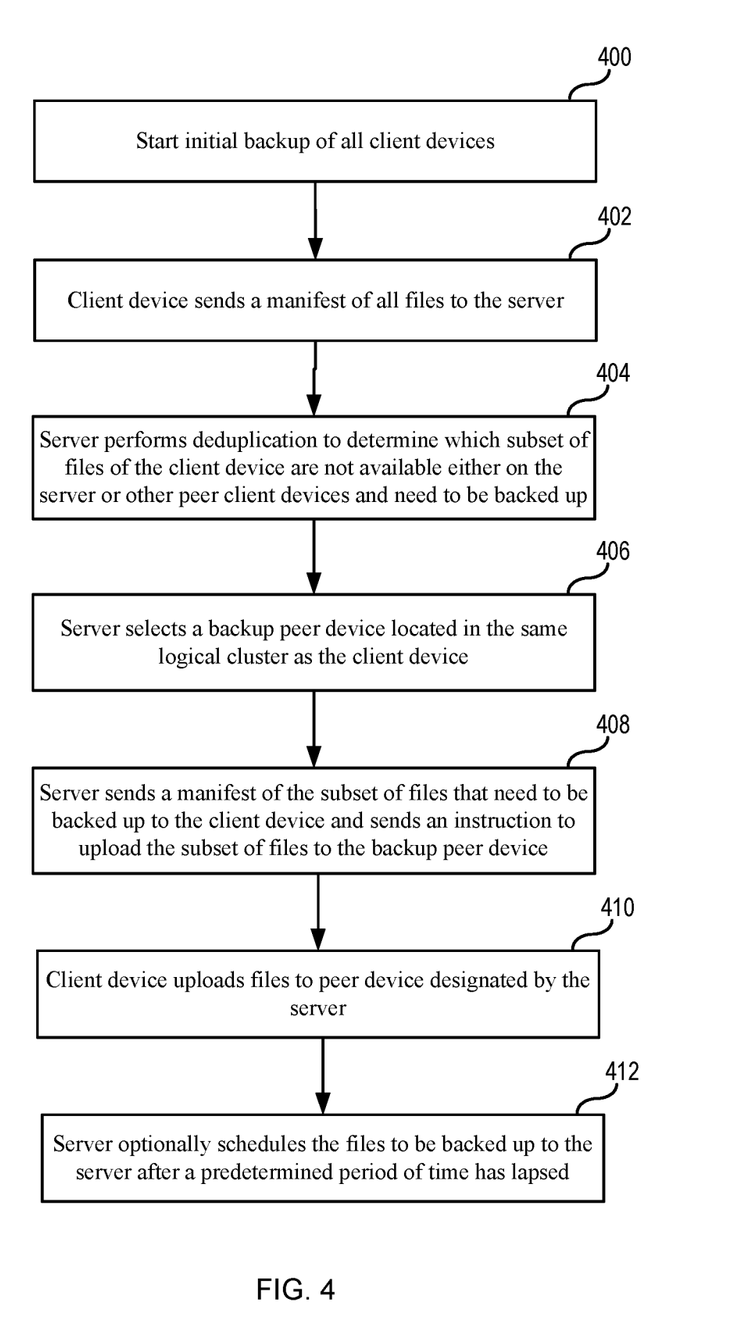
FIG. 4 illustrates a process flow of the backup process, in accordance with various embodiments.

FIG. 4 illustrates a process flow of the backup process, in accordance with various embodiments. The initial backup process of all client devices on the network is initiated in operation 400. In operation 402, a client device sends a manifest of all files located on it to the server. In operation 404, the server performs deduplication to determine which subset of files of the client device are not available on either the server or other peer backup devices in the cluster of the client device. In operation 406, the server selects a backup peer device located in the same logical backup cluster as the client device. The backup client device may be selected on the availability of the storage capacity to backup up the required content of the client device, as well as other factors. In operation 408, the server sends a manifest identifying the subset of files that need to be backed up to the client device. The server also sends an instruction to the client device, instructing it to upload some or all of the files identified in the missing files manifest to the selected backup peer device. In operation 410, the client device uploads the files that were instructed by the server to the selected backup peer device. In operation 412, the server can optionally schedule the files to be backed up to the central single instance store at a later time. The files may be scheduled to be uploaded either by the client device or by the backup peer device.

Figure 5:
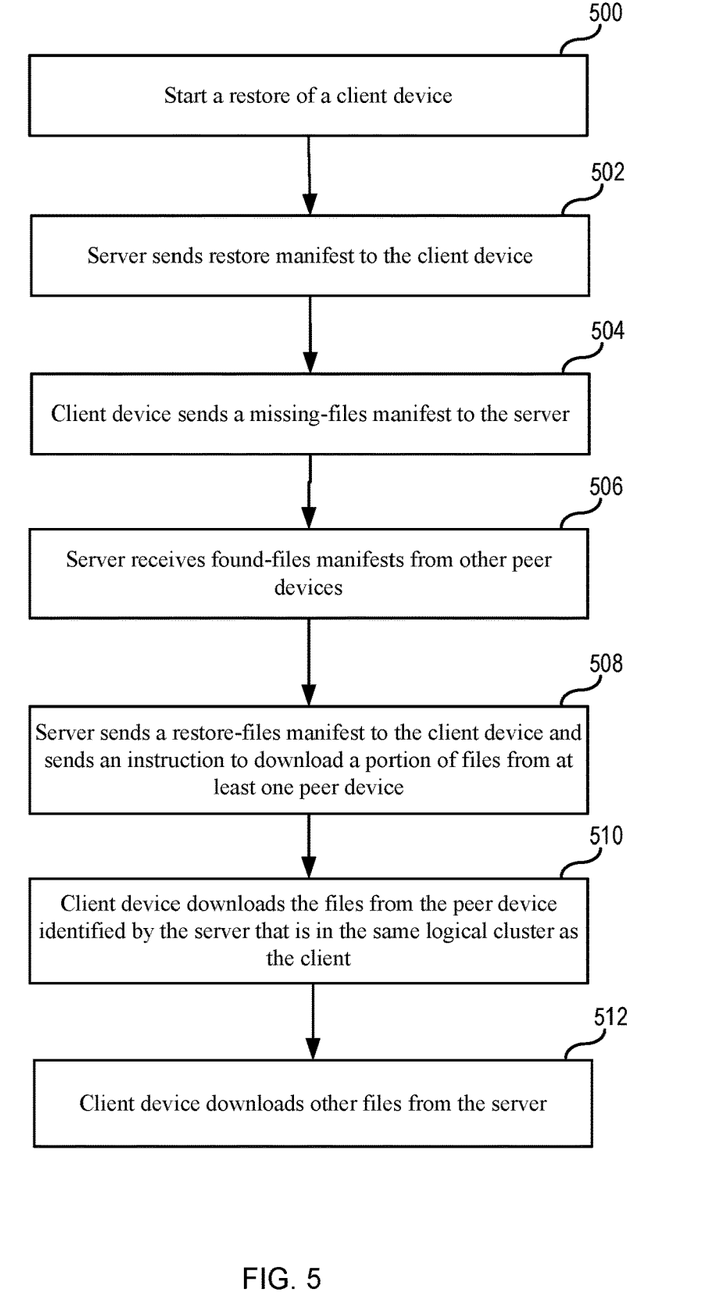
FIG. 5 illustrates a process flow of the restore process, in accordance with various embodiments.

FIG. 5 illustrates a process flow of the restore process, in accordance with various embodiments. The restore process begins in operation 500. In operation 502, the server sends a restore manifest to the client device. The restore manifest indicates which files need to be restored on the client device to return the client device to the state prior to a data loss event. In operation 504, the client device sends a missing files manifest to the server, identifying which of the necessary files are not available on the client device and need to be downloaded. In operation 506, the server communicates with other members of the logical backup cluster to receive a found-files manifest from a backup peer device. In operation 508, the server sends an instruction to indicating that the client device should download the found files from the backup peer device. In operation 510, the client device downloads the files from the backup peer device that is in the same logical backup cluster as the client device. In operation 512, the client device may also download other files from the central server, as previously described.

Figure 6:
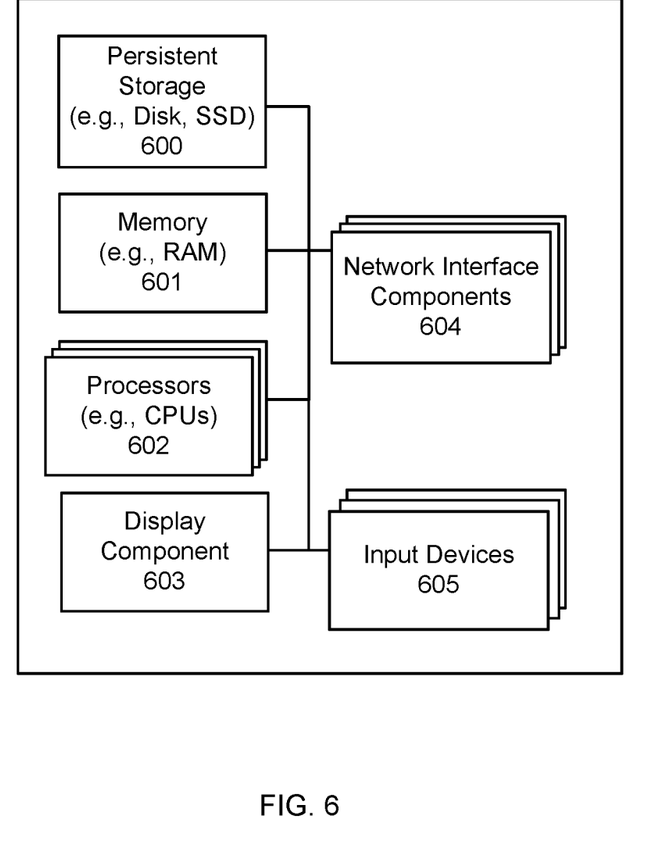
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for backing up data between a plurality of client devices, the method comprising:
    receiving, from a first client device to a central server, a manifest that identifies a listing of all files located on the first client device;
    performing a deduplication calculation by the central server to determine which subset of files from the listing of all files of the first client device are required to be backed up in order to enable a full backup and restore of the first client device, wherein the deduplication calculation is performed by comparing the manifest received from the first client device to manifests of other client devices in the plurality of client devices;
    selecting, by the central server, a second client device from the plurality of client devices that co-resides on a same logical cluster as the first client device to store backup copies of the subset of files of the first client device; and
    transmitting an instruction from the central server to the first client device, the instruction identifying the second client device and causing the first client device to send the subset of files to the second client device that co-resides in the same logical cluster as the first client device.

2. The method of claim 1, further comprising:
    scheduling the second client device to upload the subset of files of the first client device to the central server after a predefined time period has passed.

3. The method of claim 2, further comprising:
    prioritizing the uploading of the subset of files from the second client device to the central server based on a replication factor of each file, wherein the replication factor of a file is based on how many other client devices among the plurality of client devices also contain said file.

4. The method of claim 1, further comprising:
    receiving, by a central server, a request to restore the first client device, the request including a missing files manifest that indicates which files are needed to restore the first client device;
    determining, by the central server, that the second client device contains at least one of the files indicated in the missing files manifest; and
    transmitting an instruction to the second client device, instructing the second client device to upload the at least one of the files indicated in the missing files manifest to the first client device.

5. The method of claim 1, wherein each client device in the plurality of client devices includes a single instance store configured to store backup copies of files.

6. The method of claim 1, wherein each client device of the plurality of client devices transmits a corresponding manifest to the central server and to all client devices in the same logical cluster as said each client device.

7. The method of claim 1, wherein the logical cluster is created based on one or more of: proximity of each client device to the first client device; deduplication ratio between client devices; replication factor of data in the logical cluster; or a role of a user associated with each client device.

8. A server computing device, comprising:
    at least one processor; and
    memory including instructions that, when executed by the at least one processor, cause the server computing device to:
        receive, from a first client device, a manifest that identifies a listing of all files located on the first client device;
        perform a deduplication calculation to determine which subset of files from the listing of all files of the first client device are required to be backed up in order to enable a full backup and restore of the first client device, wherein the deduplication calculation is performed by comparing the manifest received from the first client device to manifests of other client devices in the plurality of client devices;
        select a second client device from the plurality of client devices that co-resides on a same logical cluster as the first client device to store backup copies of the subset of files of the first client device; and
        transmit an instruction to the first client device, the instruction identifying the second client device and causing the first client device to send the subset of files to the second client device that co-resides in the same logical cluster as the first client device.

9. The server computing device of claim 8, the memory further comprising instructions that, when executed by the at least one processor, cause the server computing device to:
    schedule the second client device to upload the subset of files of the first client device to the server computing device after a predefined time period has passed.

10. The server computing device of claim 9, the memory further comprising instructions that, when executed by the at least one processor, cause the server computing device to:
    prioritize the uploading of the subset of files from the second client device to the server computing device based on a replication factor of each file, wherein the replication factor of a file is based on how many other client devices among the plurality of client devices also contain said file.

11. The server computing device of claim 8, the memory further comprising instructions that, when executed by the at least one processor, cause the server computing device to:
receive a request to restore the first client device, the request including a missing files manifest that indicates which files are needed to restore the first client device;
determine that the second client device contains at least one of the files indicated in the missing files manifest; and
transmit an instruction to the second client device, instructing the second client device to upload the at least one of the files indicated in the missing files manifest to the first client device.

12. The server computing device of claim 8, wherein each client device in the plurality of client devices includes a single instance store configured to store backup copies of files.

13. The server computing device of claim 8, wherein each client device of the plurality of client devices transmits a corresponding manifest to the central server and to all client devices in the same logical cluster as said each client device.

14. The server computing device of claim 8, wherein the logical cluster is created based on one or more of: proximity of each client device to the first client device; deduplication ratio between client devices; replication factor of data in the logical cluster; or a role of a user associated with each client device.

15. A non-transitory computer readable storage medium comprising one or more sequences of instructions, the instructions when executed by one or more processors causing the one or more processors to execute the operations of:
receiving, from a first client device to a central server, a manifest that identifies a listing of all files located on the first client device;
performing a deduplication calculation by the central server to determine which subset of files from the listing of all files of the first client device are required to be backed up in order to enable a full backup and restore of the first client device, wherein the deduplication calculation is performed by comparing the manifest received from the first client device to manifests of other client devices in the plurality of client devices;
selecting, by the central server, a second client device from the plurality of client devices that co-resides on a same logical cluster as the first client device to store backup copies of the subset of files of the first client device; and
transmitting an instruction from the central server to the first client device, the instruction identifying the second client device and causing the first client device to send the subset of files to the second client device that co-resides in the same logical cluster as the first client device.

16. The non-transitory computer readable storage medium of claim 15, further comprising instructions executed by the one or more processors, causing the one or more processors to execute the operation of:
scheduling the second client device to upload the subset of files of the first client device to the central server after a predefined time period has passed.

17. The non-transitory computer readable storage medium of claim 16, further comprising instructions executed by the one or more processors, causing the one or more processors to execute the operation of:
prioritizing the uploading of the subset of files from the second client device to the central server based on a replication factor of each file, wherein the replication factor of a file is based on how many other client devices among the plurality of client devices also contain said file.

18. The non-transitory computer readable storage medium of claim 15, further comprising instructions executed by the one or more processors, causing the one or more processors to execute the operations of:
receiving, by a central server, a request to restore the first client device, the request including a missing files manifest that indicates which files are needed to restore the first client device;
determining, by the central server, that the second client device contains at least one of the files indicated in the missing files manifest; and
transmitting an instruction to the second client device, instructing the second client device to upload the at least one of the files indicated in the missing files manifest to the first client device.

19. The non-transitory computer readable storage medium of claim 15, wherein each client device in the plurality of client devices includes a single instance store configured to store backup copies of files.

20. The non-transitory computer readable storage medium of claim 15, wherein each client device of the plurality of client devices transmits a corresponding manifest to the central server and to all client devices in the same logical cluster as said each client device.

* * * * *